G. PEACOCK.
Car Wheel.

No. 71,408.

Patented Nov. 26, 1867.

United States Patent Office.

GEORGE PEACOCK, OF SELMA, ALABAMA.

Letters Patent No. 71,408, dated November 26, 1867.

IMPROVED CAST-IRON CAR-WHEEL.

*The Schedule referred to in these Letters Patent and making part of the same.*

TO ALL WHOM IT MAY CONCERN:

Be it known that I, GEORGE PEACOCK, of Selma, in the county of Dallas, and State of Alabama, have invented a new and useful Improvement in Cast-Iron Car-Wheels; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

This invention relates to an improvement in car-wheels, and consists in constructing the wheel with arms or spokes, extending from the rim to the hub of the wheel, fortified by a curved plate, extending from the thinner or outside edge of the rim or tread of the wheel nearly to the hub, but not united with it, and leaving spaces between the arms or spokes of the wheel, around the hub, whereby a current of cold air can be thrown around the hub as well as through the eye and on as much of the body of the wheel as may be necessary to produce an equal cooling, and secure uniform contraction in the periphery and body of the wheel when it is cast. Chilled wheels, of ordinary construction, cool so rapidly at the periphery or rim, that it has been difficult and almost impossible to obtain an equal contraction of the metal throughout the wheel, but by my improved plan of openings around the hub for a current of air to pass through them, while the chilled part or rim is kept in a hot sand-bath, the wheel is cooled equally, and uniform contraction of the metal is perfectly effected. By the combination of deep arms or spokes, with openings between them, around the hub of the wheel, and a single curved plate for the body, great strength is obtained, which allows the wheel to be made much lighter than wheels of ordinary construction.

Figure 1:
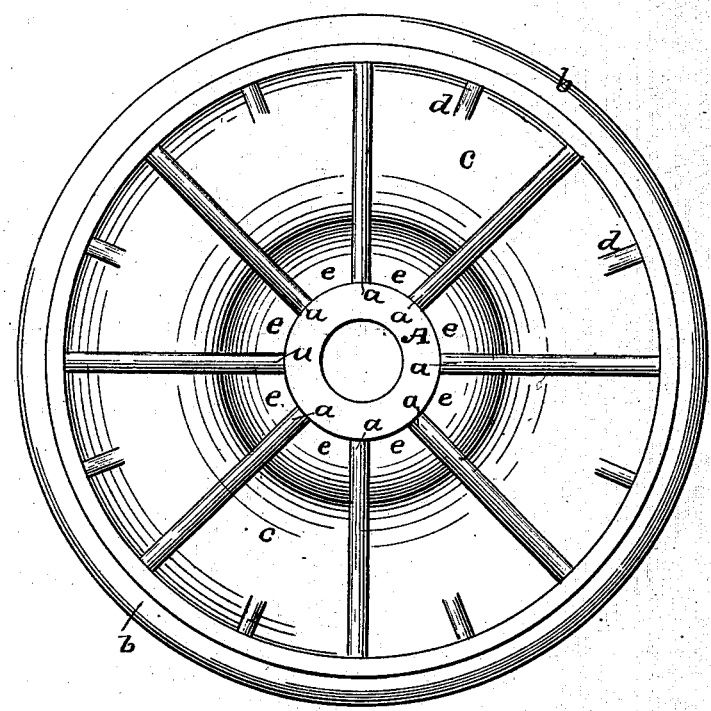
Figure 1 is an inside view of my improved car-wheel.
Figure 2:
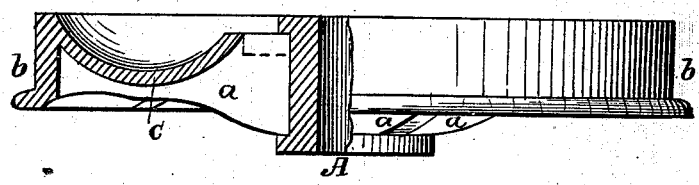
Figure 2 is a side view, partly in section, taken in the line $x\ x$.

A is the hub of the wheel, and $a\ a$ are arms or spokes, radiating from the hub to the rim $b$. These arms are made nearly as deep as the length of the hub, at their junction with it, as seen in fig. 2, and the body of the wheel is a curved plate, $c$, cast on the arms, and united on the outer side with the thin edge of the rim $b$, while the inner side does not extend to the hub, but leaves open spaces $e\ e$ between the arms $a\ a$ and the hub A, as shown clearly in fig. 1. The curved plate $c$ is cast with its convex side towards the spokes, to which it is attached. The curved form is given it for two purposes, first, to increase its own strength, and, secondly, to allow the spokes to join it on its inner edge, without producing at the point of contact a sharp angle, which always renders cast iron liable to fracture from slight causes. In my improved wheel the spokes proceed from the hub to the tread without a single angle to impair their strength, being formed stout and strong at the openings where the whole strain comes on them, and gradually diminishing by curved lines as they unite with the plate $c$, and are reinforced by its strength. Between the extremities of the arms or spokes $a\ a$, are short braces or brackets $a'\ a'$, joining the rim $b$ and the plate $c$, as shown in the drawings. The plate $c$ is cast of even thickness throughout, and is joined to the rim or tread along the inner edge of the latter, in order to prevent the accumulation of metal along the outer edge that would take place if the plate and flange $d$ were attached at the same edge.

One of the main objects of my method of constructing a car-wheel is to procure an even equal cooling and shrinking of the metal in all its parts, by which the maximum strength of the material is obtained. It is with this object in view that I balance the weight of metal in the flange $d$ by joining the plate $c$ to the rim at the opposite edge.

Having thus described my invention, what I claim as new, and desire to secure by Letters Patent, is—

1. The combination of the curved plate $c$ with the gradually diminishing arms or spokes $a\ a$, substantially in the manner and for the purpose specified.

2. The cast-iron car-wheel above described, having the deep arms $a\ a$, with openings between them around the hub, the curved plate $c$, attached to the arms $a\ a$, as shown, and united to the inner edge of the rim or tread, and the supporting-brackets $a'\ a'$, all combined and arranged substantially as and for the purposes set forth.

GEORGE PEACOCK.

Witnesses:
P. D. PARKER,
A. VON FISCHER.